United States Patent [19]

Tamaru et al.

[11] Patent Number: 5,064,593
[45] Date of Patent: Nov. 12, 1991

[54] PROCESS FOR PRODUCING MULTILAYER POLYTETRAFLUOROETHYLENE POROUS MEMBRANE

[75] Inventors: Shinji Tamaru; Katsutoshi Yamamoto; Osamu Tanaka; Hirofumi Nishibayashi, all of Osaka; Osamu Inoue, Kyoto, all of Japan

[73] Assignee: Daikin Industries Ltd., Osaka, Japan

[21] Appl. No.: 622,899

[22] Filed: Dec. 6, 1990

[30] Foreign Application Priority Data

Dec. 7, 1989 [JP] Japan .................................. 1-320273

[51] Int. Cl.$^5$ ...................... B29C 47/06; B29C 55/00; B32B 5/26
[52] U.S. Cl. ..................................... 264/113; 264/119; 264/122; 264/127; 264/288.8
[58] Field of Search ............... 264/113, 119, 122, 127, 264/288.8

[56] References Cited

U.S. PATENT DOCUMENTS

| | | | |
|---|---|---|---|
| 4,096,227 | 6/1978 | Gore | 264/288.8 X |
| 4,208,745 | 6/1980 | Okita | 264/288.8 X |
| 4,478,898 | 10/1984 | Kato | 428/36 |
| 4,707,314 | 11/1987 | Kawahigashi et al. | 264/127 |
| 4,882,113 | 11/1989 | Tu et al. | 264/127 |
| 4,961,891 | 10/1990 | Pitolaj | 264/113 |

OTHER PUBLICATIONS

Abstract of Japan 60-104319.

*Primary Examiner*—Mary Lynn Theisen
*Attorney, Agent, or Firm*—Sughrue, Mion, Zinn, Macpeak & Seas

[57] ABSTRACT

A process for producing a multilayer polytetrafluoroethylene porous membrane comprising at least two layers having different average pore diameters is disclosed, the process comprising the steps of: filling the inside of a cylinder of an extruding mold distinctively with at least two kinds of polytetrafluoroethylene fine powders with each of which a liquid lubricant has been mixed; subsequently paste-extruding the powders to obtain a multilayer extrudate, which is then optionally rolled; and then stretching the extrudate or the rolled extrudate at least monoaxially after the liquid lubricant is removed therefrom or without removing the liquid lubricant.

4 Claims, 6 Drawing Sheets

PROCESS FOR PRODUCING MULTILAYER POLYTETRAFLUOROETHYLENE POROUS MEMBRANE

FIELD OF THE INVENTION

The present invention relates to a process for producing a multilayer polytetrafluoroethylene (hereinafter referred to as "PTFE") porous membrane. More particularly, it relates to a process for producing a multilayer PTFE porous membrane in which all the layers have been united tightly and which comprises at least two layers having different average pore diameters.

BACKGROUND OF THE INVENTION

PTFE is plastics having excellent heat and chemical resistance, and porous membranes made of PTFE are extensively utilized as filter media for corrosive gases and liquids, permeable membranes for electrolysis, and battery separators. Their use as a filter medium in the precision filtration of various gases and liquids used in the semiconductor industry has become an extremely important application thereof.

In order that a porous membrane be an excellent filter medium, the pore diameter distribution of the membrane should be sharp and, when a fluid is allowed to permeate through the membrane pores at a certain pressure, the amount of the fluid passing through the membrane per unit time should be large. It has conventionally been known that the smaller the membrane thickness, the higher the permeation rate for a fluid, when porosity and pore diameter are constant. However, porous membranes having smaller membrane thicknesses may suffer deformation due to pressure exerted thereon during filtration and, as a result, the pore diameters are changed or, in some cases, the membranes are broken to be unable to function as a filter medium. In addition, the handling properties of such thin porous membranes are so poor that they are apt to be damaged when processed into filter modules or fixed to filter holders.

For the purpose of eliminating these problems, several multilayer PTFE porous membranes have been proposed which comprise a filter layer having small pore diameters and a support layer having larger pore diameters than the filter layer. Conventional processes for producing such membranes include, for example, (1) a process in which one or more PTFE porous structures having smaller pore diameters and one or more PTFE porous structures having larger pore diameters are superposed on each other in an unsintered state and then press-bonded, and the resulting film is sintered at a temperature not lower than the melting point of PTFE to obtain a multilayer PTFE porous membrane (as described in JP-A-54-97686), and (2) a process in which an unsintered film is stretched between a roll revolving at a low speed and a roll revolving at a high speed, while a temperature gradient is being created in the direction of the thickness of the thin film and, at the same time, a compressive force is being applied in that direction, thereby to obtain a porous membrane in which its obverse side and reverse side have different pore diameters (as described in JP-B-63-48562). (The term "JP-A" and "JP-B" as used herein mean an "unexamined published Japanese patent application" and an "examined Japanese patent publication", respectively.)

Further, although intended for producing a filter medium not for precision filtration but for the separation and enrichment of mixed isotopic gases, a conventional method for manufacturing a microporous permeable membrane include (3) a process in which one or more PTFE thin films in which a liquid pore-forming agent has been incorporated and one or more other PTFE thin films in which a liquid pore-forming agent has been incorporated are superposed on each other, the resulting assemblage is rolled to bond the thin films with each other, and then the liquid pore-forming agents are extracted with a low molecular weight liquid to form pores, thereby obtaining a multilayer PTFE porous membrane comprising at least two layers having different average pore diameters (as described in JP-B-55-22504).

In process (1) above, sintering of unsintered stretched superposed films at a temperature not lower than the melting point of the PTFE powders gives a fusion-bonded united film, as disclosed in JP-A-51-30277. When unsintered sheets or films made from PTFE fine powders are lapped and then sintered, the respective layers are fusion-bonded with each other to give a united shape, and this technique has conventionally been known as, for example, a manufacturing method for PTFE-lapped electrical cables and PTFE-lapped tubes or pipes. Therefore, the method of superposing stretched porous structures with different pore diameters on each other and sintering the assemblage at a temperature not lower than the melting point of the PTFE has been quite common in the art. Process (1) above is disadvantageous in that it necessitates a step of separately forming two or more sheets or films having different porosities and the subsequent sintering step, which should be performed while the sheets or films superposed on each other are being pressed together. Furthermore, in order to industrially produce films with extremely small thicknesses or low strengths by such a laminating technique, expensive facilities and a high degree of skill are required so as to avoid occurrence of wrinkling, breakage, etc. in the process.

Process (2) above is disadvantageous in that the stretching, which is conducted between rolls, is limited to monoaxial stretching and biaxial stretching cannot be used in this method.

Process (3) above is characterized in that a membrane comprising two or more layers having different average pore diameters is obtained not through stretching, but by varying the packing densities of emulsion-polymerized PTFE powders having different primary particle sizes and shapes and also by use of pore-forming agents of different kinds. However, it should be noted that the pores in this membrane are mere spaces among emulsion-polymerized PTFE particles, that is, the unsintered film obtained from emulsion-polymerized PTFE by a paste-processing technique has a structure which nearly is the closest packing of the PTFE primary particles. Illustratively state, the primary particles have specific gravities of from 2.1 to 2.3 and the processed film has a bulk specific gravity of from 1.5 to 1.6 in the case where an ordinary petroleum solvent or the like has been used for shaping the film, and the difference between the specific gravities is ascribable to pores, which are spaces among the polymer particles. Such a membrane has a poor filter performance, i.e., very poor fluid permeability, and also has a very low strength compared with sintered membranes. If the unsintered multilayer membrane is sintered in order to increase its strength, it becomes non-porous to be unusable as a filter medium for fluids in the semiconductor industry.

It has been proposed to obtain a multilayer porous membrane by a method in which rolled PTFE sheets containing a lubricant are superposed on each other, and the resulting assemblage is further rolled to a smaller thickness and then stretched (as described in JP-A-57-131236). The porous membrane obtained by this process, however, consists of layers that do not differ in porosity from each other at all, although it has high inter-layer bonding strength. JP-B-56-17216 discloses a process for producing a single-layer PTFE porous membrane having a high tensile strength. Conventionally, the size of small pores has been controlled by stretching and amorphous-lock, especially by changing the temperature, the drawing rate per unit time, and the draw ratio.

On the other hand, unsymmetrical membranes consisting of an extremely thin filter layer and a support layer which is thicker and has larger pore diameters than the filter layer are manufactured from cellulose acetate or polysulfone. However, since such unsymmetrical membranes are obtained by wet coagulation processes, the membrane material is required to be soluble in the solvent used and, hence, this method has not been applicable to PTFE, which is not soluble in any ordinary solvent at all.

SUMMARY OF THE INVENTION

The present inventors have conducted intensive studies in order to eliminate the above-described problems of the conventional techniques. As a result, a method has been developed for producing a multilayer PTFE porous membrane which comprises a filter layer having a small average pore diameter and a support layer having a larger average pore diameter than the filter layer, and in which all the layers have been bonded to the adjacent layer(s) completely throughout the interface(s). By this method, an extremely thin filter layer can be formed.

That is, the present inventors have surprisingly found that by stretching a multilayer structure consisting of layers of two or more kinds of PTFE fine powders having different average molecular weights, a multilayer porous membrane can be obtained easily in which the layers have different pore diameters despite the same stretching conditions and which is free of interlaminar peeling.

Accordingly, an object of the present invention is to provide a process for producing a multilayer PTFE porous membrane free from the above-described prior art problems and having excellent permeability to various kinds of gases and liquids.

Other objects and effects of the present invention will be apparent from the following description.

The present invention provides a process for producing a multilayer polytetrafluoroethylene porous membrane comprising at least two layers having different average pore diameters, the process comprising the steps of: filling the inside of a cylinder of an extruding mold distinctively with at least two kinds of polytetrafluoroethylene fine powders with each of which a liquid lubricant has been mixed; subsequently paste-extruding the powders to obtain a multilayer extrudate, which is then optionally rolled; and then stretching the extrudate or the rolled extrudate at least monoaxially after the liquid lubricant is removed therefrom or without removing the liquid lubricant.

DETAILED DESCRIPTION OF THE INVENTION

Figure 1A:
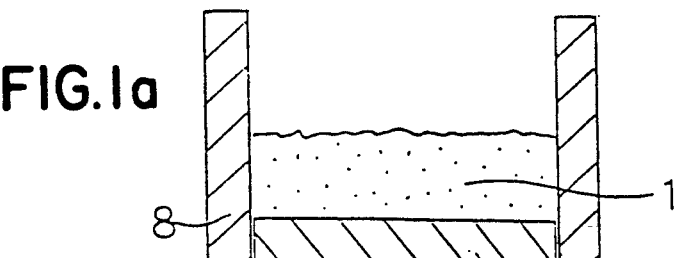
FIG. 1 diagrammatically illustrates steps for producing a multilayer preform according to one embodiment of the process of the present invention.
Figure 1E:
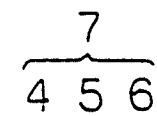
Figure 1B:
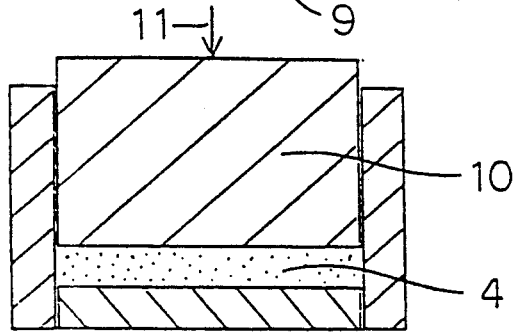
Figure 1C:
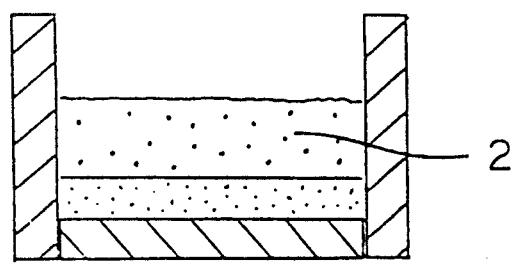
Figure 1D:
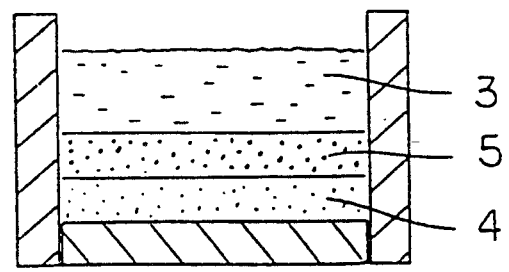

The process of the present invention for producing a multilayer PTFE porous membrane comprises the following steps.

(1) Paste-Extrusion Step:

This step may be performed according to the paste-extrusion method conventionally known as a technique for manufacturing PTFE unsintered articles. However, this step is characterized in that prior to extrusion, a multilayer preform 7 is obtained, for example, in a manner such as that illustrated in FIG. 1. As FIG. 1 (e) shows, this multilayer preform 7, for example, consists of a first layer 4, a second layer 5, and a third layer 6 made of three PTFE fine powders 1, 2, 3, respectively (the Figure shows an example of a preform of a three-layer flat structure, but the preform prepared in the present invention is not limited thereto). Each of the layers 4 to 6 is formed from a wetted powder obtained by adding a liquid lubricant, such as solvent naphtha or white oil, to a fine powder prepared by the coagulation of an aqueous dispersion of emulsion-polymerized PTFE having an average primary particle diameter of from 0.2 to 0.4 μm. The amount of the liquid lubricant to be used is varied depending on its kind, forming conditions, etc. Generally, however, the liquid lubricant is used in an amount of from 20 to 35 parts by weight per 100 parts by weight of the fine powder. A colorant or the like may further be added to the fine powder. The preform 7 is prepared as follows. First, as shown in FIG. 1 (a), a PTFE fine powder 1 for obtaining a first layer 4 is placed in a box-shaped mold 8 in such a manner that the powder 1 is spread over a bottom force 9 to form a layer of the powder 1. Subsequently, as shown in FIG. 1 (b), a top force 10 is pressed against the powder in the direction indicated by arrow 11. Thus, the powder is compressed to form the first layer 4.

The top force 10 is then removed, and a PTFE fine powder 2 for forming a second layer 5 is placed in the mold 8 as shown in FIG. 1 (c). This powder 2 is compressed with the top force 10 in the same manner as in FIG. 1 (b) described above, to form the second layer 5 on the first layer 4 as shown in FIG. 1 (d). Thereafter, a PTFE fine powder 3 for forming a third layer 6 is placed in the mold 8 as shown in FIG. 1 (d) and then compressed with the top force 10.

Figure 2:
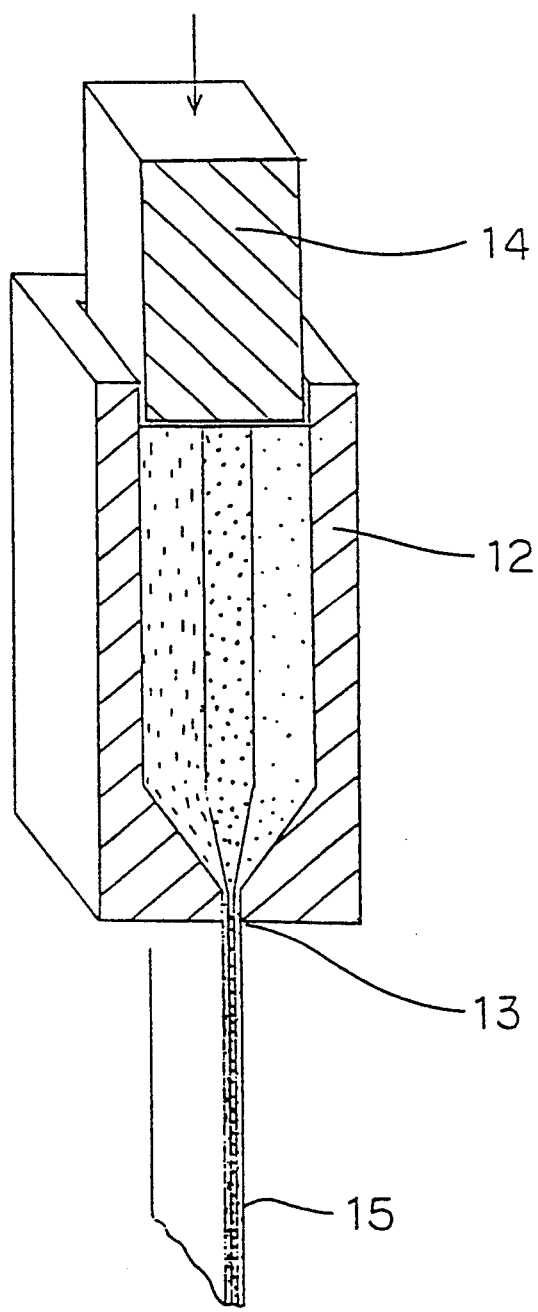
FIG. 2 is a sectional view illustrating the state of paste extrusion being performed according to one embodiment of the process of the present invention.

Thus, the multilayer preform 7 is finally obtained which comprises the first layer 4, the second layer 5, and the third layer 6 as shown in FIG. 1 (e), and which has been shaped so as to fit almost tightly into the inside of the cylinder 12 of a paste-extruding mold shown in FIG. 2.

This preform 7 is put in the cylinder 12 of a paste-extrusion apparatus shown in FIG. 2, and then pushed with a ram 14. This cylinder 12 of the mold shown in FIG. 2, for example, has a rectangular section measuring 50 mm×100 mm, in the direction perpendicular to the axis, and narrows at one end thereof at an outlet part 13 of the mold to form a nozzle having an orifice measuring 50 mm×5 mm.

By pushing the preform 7 through the nozzle orifice, the first layer 4, the second layer 5, and the third layer 6 are completely united to form a paste-extruded sheet 15 in which each layer has a uniform thickness. It was ascertained by a stereomicroscopic examination that the relative thickness of each of the layers constituting this paste-extruded sheet 15 was the same as that for the multilayer preform used. As described above, by forming the preform 7 beforehand, it has become possible to easily produce even a laminate having a very thin and low-strength layer; production of such a laminate has been difficult with the conventional techniques.

(2) Rolling Step:

In this step, which may be performed if required and necessary, the paste-extruded sheet may be rolled according to an ordinary rolling method as follows.

The sheet obtained in paste-extrusion step (1) is cut into a proper length. The cut sheet is rolled by means of pressure rolls in a direction along or across the extruding direction, thereby to obtain a multilayer film having a thickness of, for example, 100 μm.

Thereafter, the liquid lubricant may be or may not be removed from the multilayer film. The removal of the liquid lubricant can be conducted by extraction and/or drying (for example, heat-drying in an oven at 250° C. for 20 seconds). Thus, a multilayer PTFE unsintered film is obtained. The removal of the liquid lubricant may be carried out after the subsequent stretching step.

In the above-described paste-extrusion step (1) and rolling step (2) if any, the PTFE preform receives shearing force to partly change into fibers. Due to the fiber formation, the paste-extruded sheet or the rolled film can have a moderate strength and elongation, which are properties needed for the subsequent stretching step.

All procedures in the above two steps are performed at temperatures not higher than about 327° C., which is the melting point of sintered PTFE, and in general, performed at around room temperature.

(3) Stretching Step:

The multilayer unsintered film obtained through the above-described paste-extrusion step (1) and rolling step (2) if any is stretched at least monoaxially.

In this step, the multilayer unsintered film is stretched in an unsintered state. The stretching is generally carried out between rolls revolving at different speeds or by means of a tenter in an oven. The stretching temperature is preferably not higher than the melting point of sintered PTFE. The stretching may be performed either monoaxially or biaxially, and the draw ratio may be determined according to use of the membrane being produced.

(A) In the case of monoaxial stretching, the multilayer unsintered film is stretched in a direction parallel with or perpendicular to the extruding direction.

(B) In the case of biaxial stretching, the multilayer unsintered film is first stretched in the same manner as (A) above, and subsequently further stretched in a direction perpendicular to the first stretching.

Through the stretching, each layer in the multilayer unsintered film comes to be of a porous structure in which micropores are present uniformly throughout the layer. Thus a multilayer PTFE porous membrane in which each layer has micropores is finally obtained.

If required and necessary, the multilayer porous membrane thus obtained may be heated at a temperature not lower than the melting point of sintered PTFE, or at a temperature not lower than the stretching temperature. Due to this heating, the multilayer porous membrane is made to undergo no dimensional change and to have an enhanced mechanical strength.

The average pore diameters of the layers in the multilayer porous membrane are determined by the kind of the PTFE fine powders 1, 2, 3, etc. used to constitute respective layers and by incorporation of other ingredient(s) thereinto. Illustratively stated, in order that a multilayer porous membrane comprising two or more layers having different average pore diameters be obtained according to the present invention, it is important that the two or more layers should be made respectively from at least two kinds of PTFE fine powders 1, 2, 3 etc.

One factor that can make one of the PTFE fine powders 1, 2, 3, etc. different from one or more of the other fine powders is average molecular weight.

Generally, in a multilayer PTFE porous membrane obtained from a combination of a PTFE fine powder having an average molecular weight of 6,000,000 or more and a PTFE fine powder having an average molecular weight less than 6,000,000, the layer made from the PTFE fine powder having an average molecular weight of 6,000,000 or more has a smaller average pore diameter than the layer made from the PTFE fine powder having an average molecular weight less than 6,000,000. The combination of a PTFE fine powder having an average molecular weight of from 3,500,000 to 6,000,000 and that having an average molecular weight of from 6,000,000 to 10,000,000 is preferably used. It is preferable in such a case that the average molecular weight difference between the two powders be 1,000,000 or more, and the larger the average molecular weight difference, the more preferred.

The term "PTFE" herein includes not only homopolymers of tetrafluoroethylene but also copolymers of tetrafluoroethylene and not more than 2% by weight, preferably not more than 1% by weight, of other monomer(s) copolymerizable therewith, e.g., trifluorochloroethylene, hexafluoropropylene, perfluoroalkyl vinyl ether, etc.

In the case where the PTFE constituting a fine powder is a homopolymer, its average molecular weight (Mn) can be calculated from the value of the specific gravity (S.G.) of the PTFE fine powder particle, using the following equation.

$$\log_{10} Mn = 28.04 - 9.790 \times S.G.$$

In the case where the PTFE constituting a fine powder is a copolymer, however, there are cases where the average molecular weight value calculated using the above equation does not agree with the actual average molecular weight. Therefore, PTFE fine powders to be combined with each other are not substantially limited in average molecular weight and those having average molecular weights outside the above-specified range may be used, as long as mono-layer films separately made from the respective PTFE fine powders give, when stretched under the same conditions, mono-layer porous membranes having different average pore diameters.

Another factor that can make one of the PTFE fine powders 1, 2, 3, etc. different from one or more of the other fine powders is the presence of a non-fiber-forming material, i.e., the case in which at least one of the PTFE fine powders 1, 2, 3, etc. contains a non-fiber-forming material.

In general, PTFE fine powder particles have the property of readily forming fibers during the paste-extrusion step, rolling step, stretching step, etc., where shear stress is exerted on the powder particles being treated. On the other hand, particles of a low molecular weight PTFE polymer and particles of a polymer such as PFA (tetrafluoroethylene-perfluoroalkyl vinyl ether copolymer), FEP (tetrafluoroethylene-hexafluoropropylene copolymer), or the like do never form fibers in the above processing steps. For this reason, a layer of fine powder containing a non-fiber-forming material, such as the polymer particles mentioned above, forms a smaller number of fibers through the above-described steps and, as a result, gives a stretched layer having a larger average pore diameter, while a stretched layer made from PTFE fine powder only has a smaller average pore diameter. The non-fiber-forming polymer particles do not readily fall off the layer since they have been incorporated in interlocked fibers formed from the fine powder. However, in order to completely prevent the non-fiber-forming polymer particles from falling off the final porous membrane, it is effective to heat the membrane at a temperature not lower than the melting point of the polymer particles thereby to fusion-bond the polymer particles to the fibers.

The amount of the non-fiber-forming polymer particles mixed with a fine powder is generally from 5 to 120 parts by weight, preferably from 20 to 100 parts by weight, per 100 parts by weight of the PTFE fine powder. If the incorporated amount thereof is less than 5 parts by weight, no effect is produced by the incorporation thereof. If the amount thereof is larger than 120 parts by weight, there is a problem that the resulting multilayer porous membrane has impaired strength.

The non-fiber-forming material is not limited to fluoroplastics such as those described above. Other materials that can be used as the non-fiber-forming material to produce the above-described effect include inorganic materials such as carbon, graphite, titanium oxide, iron oxide, silica, glass fibers, and other inorganic particles such as glass beads, and organic materials such as particles of organic polymers including a polyimide, polyamideimide, polyphenylene sulfide, aromatic polyester, polyetheretherketone, and the like.

The particle diameter of the non-fiber-forming material is generally from 0.03 to 20 $\mu$m, and preferably from 1.0 to 10 $\mu$m. If it is smaller than 0.03 $\mu$m, the effect of the addition thereof tends to be insufficient, and if it is larger than 20 $\mu$m, the molding property of the PTFE fine powder tends to be deteriorated.

The particle diameter of the PTFE fine powder used in the present invention is not particularly limited, and is preferably from 200 to 1,000 $\mu$m, and more preferably from 450 to 600 $\mu$m.

As described hereinabove, the process of the present invention can provide a multilayer PTFE porous membrane in which all the layers have been united tightly and which comprises at least two layers having different average pore diameters, only by the ordinary steps of PTFE paste extrusion, rolling if any, and stretching. This process is characterized in that at least two kinds of PTFE fine powders 1, 2, 3, etc. are used to form the respective layers in the multilayer porous membrane, and that the process does not necessitate the troublesome step of superposing films on each other.

According to the process of the present invention, the filter layer, which has the smallest average pore diameter and determines permeability to gases and liquids, can be made to have a very thin thickness. Therefore, the multilayer PTFE porous membrane obtained by the process of the present invention is useful as a high-permeability filter medium for precision filtration and, further, there is no fear of interlaminar peeling during use since all the layers have been completely united.

In the case where the multilayer PTFE porous membrane produced by the process of the present invention is a flat membrane, it is useful as a filter medium for the precision filtration of liquids and gases, a battery separator, a permeable membrane for electrolysis, an electrical insulating material, or the like. In the case where the multilayer porous membrane is a tubular membrane, it is useful as a hollow fiber filter medium for liquids and gases, a material for producing artificial organs, such as artificial blood vessels and artificial lungs, endoscope tubes, etc.

The present invention will be explained in more detail by reference to the following Examples and Comparative Example, but the Examples should not be construed to be limiting the scope of the present invention.

In the examples, various properties were measured by the following methods.

(1) Membrane Thickness:

The membrane thickness was measured with a membrane thickness meter (model "1D-110MH", manufactured by Mitsutoyo Co., Ltd., Japan).

(2) Porosity:

The pores in the membrane to be evaluated are filled with pure water by the ethanol displacement method and the weight W (g) of this water-impregnated membrane was measured.

Further, the absolute dry weight $W_O$ (g) and volume V (cm$^3$) of the membrane were measured. From these measured values, the porosity was calculated using the following equation.

$$Porosity = (W - W_O) \times 100/V \, (\%)$$

(3) Gas Permeability:

The porous membrane to be evaluated was cut into a disk having a diameter of 25 mm, and this disk was fixed to a filter holder having an effective permeation area of 2.15 cm$^2$. One side of the resulting filter was exposed to a pressurized nitrogen gas of 0.639 bar and the amount of the nitrogen gas passing through the membrane was measured with a mass flow meter.

From the thus-measured value, permeation rate (unit; l/cm².hr) was calculated which was the amount of the gas that passed through the membrane per square centimeter (cm²) of the effective permeation area per hour.

(4) Average Pore Diameter:

The mean flow pore diameter (MFP) measured by "Coulter Porometer" (manufactured by Coulter Electronics Co., U.S.A.) was regarded as the average pore diameter. From the following model experiment, it was ascertained that the thus-measured average pore diameter of the multilayer porous membrane of the present invention was substantially in agreement with the average pore diameter of the layer in the multilayer porous membrane that had he smallest average pore diameter.

Model Experiment

Two kinds of single-layer PTFE porous membranes were prepared which were porous membrane A having an average pore diameter as measured by "Coulter Porometer" of 0.20 μm and a thickness of 47 μm and porous membrane B having an average pore diameter as measured by "Coulter Porometer" of 0.98 μm and a thickness of 69 μm. Then, porous membrane A was just superposed on porous membrane B to give a two-layer porous membrane. On the other hand, one porous membrane A, as an intermediate layer, was sandwiched between two porous membranes B to give three-layer porous membrane. The thus-obtained two multilayer porous membranes were examined for average pore diameter with "Coulter Porometer". As a result, the average pore diameter of the former membrane was 0.19 μm and that of the latter was 0.18 μm, these average pore diameter values being substantially in agreement with the average pore diameter of porous membrane A.

In the following Examples and Comparative Example, three kinds of PTFE fine powders specified below were used.

| PTFE fine powder | Average molecular weight | Non-fiber-forming material |
|---|---|---|
| 1 | 5,100,000 | — |
| 2 | 7,200,000 | — |
| 3 | 5,100,000* | Polymer particles of low molecular weight PTFE |

Note: *Excepting the low molecular weight PTFE

The above PTFE fine powders 1 to 3 each has an average primary particle diameter of from about 0.2 to 0.4 μm and has been obtained by the coagulation of an aqueous dispersion of emulsion-polymerized PTFE.

PTFE fine powders 1 and 2 were commercially available products and PTFE fine powder 3 was prepared in the following manner.

Preparation Method for PTFE Fine Powder 3

100 Parts by weight, on a dry basis, of an aqueous dispersion of emulsion-polymerized PTFE having an average molecular weight of 5,100,000 and an average primary particle diameter of from about 0.2 to 0.4 μm was mixed with 100 parts by weight, on a dry basis, of an aqueous dispersion of low molecular weight PTFE polymer particles (trade name "Lublon L-5", particle diameter: 0.1 to 0.4 μm, average molecular weight: 300,000 to 600,000, manufactured by Daikin Industries, Ltd., Japan) as a non-fiber-forming material. This mixture was stirred in a stirring vessel, upon which the two kinds of primary particles were mixed uniformly and coagulate to form secondary particles of about 200 to 1,000 μm. The resulting secondary particles were dried at 150° C. to remove the water, thereby obtaining PTFE fine powder 3.

EXAMPLE 1

100 Parts by weight of each of PTFE fine powder 1 (average molecular weight 5,100,000) and PTFE fine powder 2 (average molecular weight 7,200,000) was mixed with 23 parts by weight of a liquid lubricant (trade name "Isopar M", manufactured by Exxon Co.). In a manner similar to that illustrated in FIG. 1, the resulting two kinds of wetted powders were used to prepare a multilayer preform in which the ratio of the thickness of one layer to that of the other was 1/1. Subsequently, this multilayer preform was put in the cylinder 12 of a paste-extruding mold as shown in FIG. 2, and then extruded by means of a ram 14 to obtain a sheet. The sheet thus obtained was cut into about 100 mm length, and rolled in a direction perpendicular to the extruding direction. The rolled sheet was then heat-dried in an oven at 250° C. for 20 seconds to remove the liquid lubricant, thereby obtaining a multilayer unsintered film having a thickness of 100 μm.

Separately, the same multilayer unsintered film as that obtained above was prepared in the same manner as above except that one of the two powders used had been colored beforehand with a pigment. A section of this multilayer film, which section was cutting across the thickness of the film, was examined with a stereomicroscope. As a result, it was ascertained that the ratio of the thickness of one layer to that of the other was 1/1 as similar to the case of the multilayer preform.

In an oven kept at about 300° C., the multilayer unsintered film obtained above was stretched in an unsintered state in a direction same as the rolling direction at a stretching rate of 1,000%/sec in a draw ratio of 2.5, thereby obtaining a multilayer porous membrane having a thickness of 96 μm.

Figure 3:
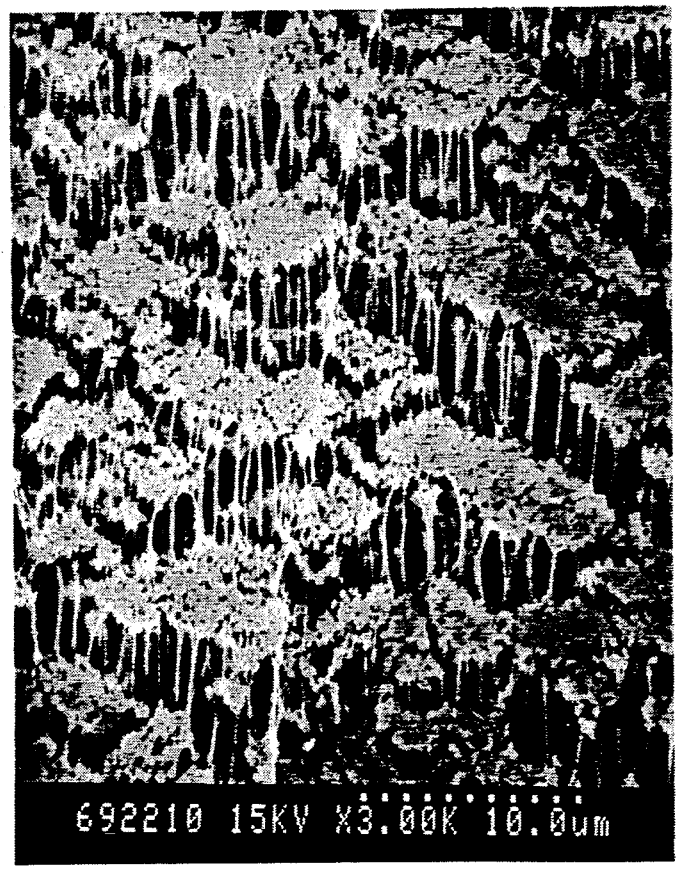
FIG. 3 is a scanning eletron photomicrograph (magnification: 3,000) of the surface of that layer in the multilayer porous membrane of Example 1 which has been formed from PTFE fine powder 1.
Figure 4:
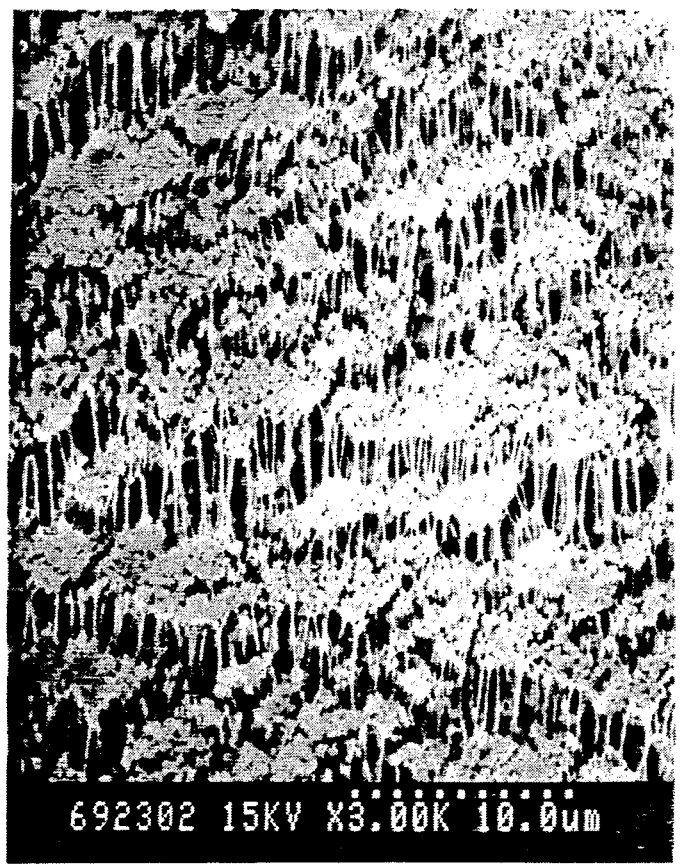
FIG. 4 is a scanning electron photomicrograph (magnification: 3,000) of the surface of that layer in the multilayer porous membrane of Example 1 which has been formed from PTFE fine powder 2.

A scanning electron photomicrograph (magnification: 3,000; hereinafter referred to as "SEM photograph") of the surface of that layer of the multilayer porous membrane which was made from fine powder 1 is shown in FIG. 3, while an SEM photograph of the surface of the layer made from fine powder 2 is shown in FIG. 4. From the two photographs, it can be seen that in the multilayer porous membrane obtained, the layer made from fine powder 1 had a larger average pore diameter and the layer made from fine powder 2 had a smaller average pore diameter.

This multilayer porous membrane had a porosity of 70%, an average pore diameter of 0.33 μm, and a gas permeation rate of 66.1 l/cm².hr.

EXAMPLE 2

Using the same PTFE fine powders 1 and 2 as those used in Example 1, extrusion, rolling, and stretching were conducted in the same manner as in Example 1 except that the ratio of the thickness of the layer of fine powder 1 to that of the layer of fine powder 2 was 4/1. Thus, a multilayer porous membrane having a thickness of 95 μm was obtained. As similar to Example 1, a comparison between SEM photographs of the surfaces of the two layers of the thus-obtained multilayer porous membrane showed that the layer made from fine powder 1 had a larger average pore diameter and the layer made from fine powder 2 had a smaller average pore diameter. This multilayer porous membrane had a porosity of 68%, an average pore diameter of 0.34 μm, and a gas permeation rate of 86.1 l/cm²·hr.

EXAMPLE 3

Using PTFE fine powder 3, which was a mixture of 100 parts by weight of the same PTFE fine powder 1 as that used in Example 1 and 100 parts by weight of low molecular weight PTFE polymer particles, and also using the same PTFE fine powder 2 as that used in Example 1, extrusion, rolling, and stretching were conducted in the same manner as in Example 1 except that the ratio of the thickness of the layer of fine powder 3 to that of the layer of fine powder 2 was 4/1. Thus, a multilayer porous membrane having a thickness of 99 μm was obtained.

Figure 5:
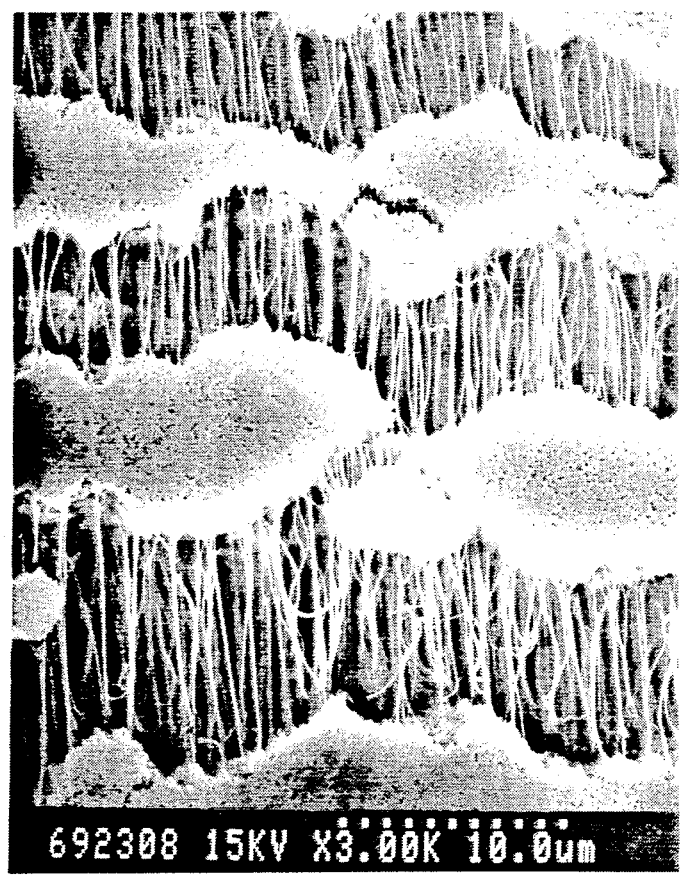
FIG. 5 is a scanning electron photomicrograph (magnification: 3,000) of the surface of that layer in the multilayer porous membrane of Example 3 which has been formed from PTFE fine powder 3.
Figure 6:
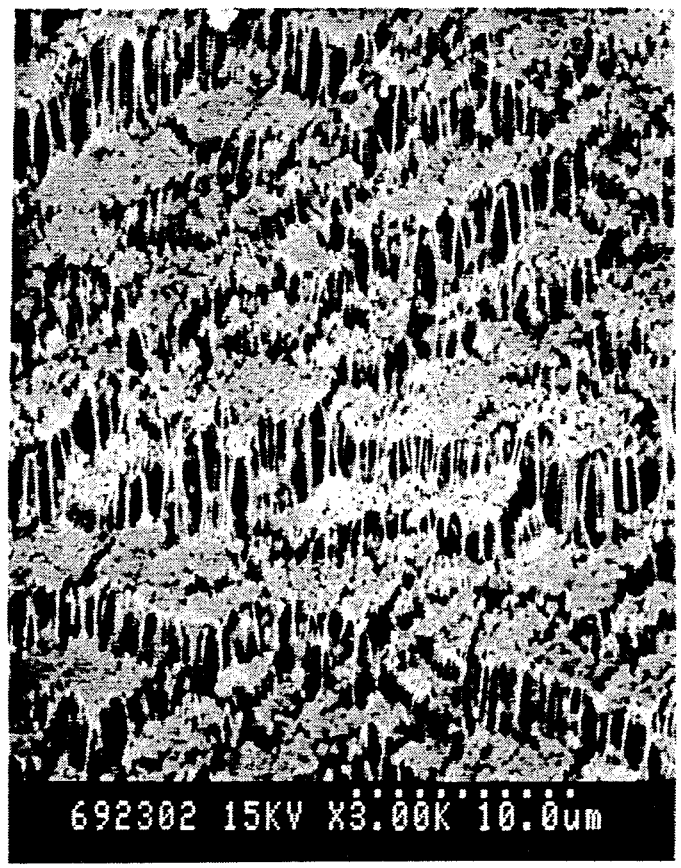
FIG. 6 is a scanning electron photomicrograph (magnification: 3,000) of the surface of that layer in the multilayer porous membrane of Example 3 which has been formed from PTFE fine powder 2.

An SEM photograph of the surface of that layer of the thus-obtained multilayer porous membrane which was made from fine powder 3 is shown in FIG. 5, while an SEM photograph of the surface of the layer made from fine powder 2 is shown in FIG. 6. From the two photographs, it can be seen that in the multilayer porous membrane obtained, the layer made from fine powder 3 has a larger average pore diameter and the layer made from fine powder 2 has a smaller average pore diameter.

This multilayer porous membrane had a porosity of 71%, an average pore diameter of 0.34 μm, and a gas permeation rate of 110.6 l/cm²·hr.

EXAMPLE 4

Using the same PTFE fine powder 3 as that used in Example 3 and the same PTFE fine powder 2 as that used in Example 1, a multilayer preform was prepared which had a three-layer structure consisting of one fine powder 2 layer sandwiched between two fine powder 3 layers, with the ratio of the thickness of one of the fine powder 3 layers to that of the fine powder 2 layer to that of the other fine powder 3 layer being 4/1/4. This preform was extruded and rolled in the same manner as in Example 1 to obtain a multilayer unsintered film having a thickness of 55 μm. This multilayer unsintered film was then stretched in the same manner as in Example 1, thereby obtaining a multilayer porous membrane having a thickness of 53 μm. This multilayer porous membrane had a porosity of 72%, an average pore diameter of 0.42 μm, and a gas permeating rate of 853.9 l/cm²·hr.

The thickness of the intermediate layer of the above-obtained multilayer porous membrane was measured and found to be about 5 μm. Separately, it was tried to prepare the same multilayer porous membranes as above by the conventional laminating method, but membrane fabrication was so difficult that none of the thus-obtained multilayer porous membranes had an intermediate layer having a uniform thickness of about 5 μm.

Further, the multilayer porous membranes obtained in Examples 1 to 4 were subjected to a physical breakage test in the following manner: On both sides of the porous membrane at the edge thereof, adhesive tapes were adhered while the adhesive tapes did not contact with each other. The adhesive tape were pulled to be peeled from the porous membrane, and it was observed whether or not interlaminar peeling occurred in the porous membrane. As a result, no interlaminar peeling was observed in all the porous membrane.

COMPARATIVE EXAMPLE

Using PTFE fine powder 2 only as raw fine powder, extrusion, rolling, and stretching were conducted in the same manner as in Example 1 to obtain a porous membrane having a thickness of 97 μm.

This porous membrane had a porosity of 70%, an average pore diameter of 0.32 μm, and a gas permeation rate of 33.0 l/cm²·hr.

Table 1 summarizes the results of the above Examples and Comparative Example.

TABLE 1

| | Membrane thickness (μm) | Porosity (%) | Average pore diameter (μm) | Gas permeation rate (l/cm² · hr) |
|---|---|---|---|---|
| Example 1 | 96 | 70 | 0.33 | 66.1 |
| Example 2 | 95 | 68 | 0.34 | 86.0 |
| Example 3 | 99 | 71 | 0.34 | 110.6 |
| Example 4 | 53 | 72 | 0.42 | 853.9 |
| Comparative Example | 97 | 70 | 0.32 | 33.0 |

While the invention has been described in detail and with reference to specific embodiments thereof, it will be apparent to one skilled in the art that various changes and modifications can be made therein without departing from the spirit and scope thereof.

What is claimed is:

1. A process for producing a multilayer polytetrafluoroethylene porous membrane comprising at least two layers having different average pore diameters, said process comprising the steps of: filling the inside of a cylinder of an extruding mold distinctively with at least two kinds of polytetrafluoroethylene fine powders with each of which a liquid lubricant has been mixed; subsequently paste-extruding said powders to obtain a multilayer extrudate, which is then optionally rolled; and then stretching said extrudate or said rolled extrudate at least monoaxially after said liquid lubricant is removed therefrom or without removing said liquid lubricant.

2. A process as claimed in claim 1, wherein at least one of said polytetrafluoroethylene fine powders differs from at least one of the other powders in average molecular weight.

3. A process as claimed in claim 1, wherein at least one of said polytetrafluoroethylene fine powders has an average molecular weight which is larger than that of at least one of the other powders by at least 1,000,000.

4. A process as claimed in claim 1, wherein at least one of said polytetrafluoroethylene fine powders contains a non-fiber-forming material.

* * * * *